(12) United States Patent
Dimitri et al.

(10) Patent No.: US 6,513,074 B1
(45) Date of Patent: Jan. 28, 2003

(54) SCSI BUS INTELLIGENT LISTENING DEVICE AND METHOD

(75) Inventors: Kamal Emile Dimitri, Tucson, AZ (US); John Edward Kulakowski, Tucson, AZ (US); Rodney Jerome Means, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,833

(22) Filed: Jan. 6, 2000

(51) Int. Cl.⁷ .................................................. G06F 3/00
(52) U.S. Cl. ............................ 710/1; 710/20; 710/27; 710/107; 710/128; 709/201; 712/225
(58) Field of Search .......................... 710/1, 5, 20, 27, 710/24, 31, 72, 107, 113, 123, 128, 127, 112; 709/201, 232, 244, 246, 233; 712/32, 225, 39

(56) References Cited

U.S. PATENT DOCUMENTS

| | | | |
|---|---|---|---|
| 5,289,589 A | | 2/1994 | Bingham et al. ............ 395/425 |
| 5,423,018 A | | 6/1995 | Dang et al. ................. 395/425 |
| 5,546,557 A | | 8/1996 | Allen et al. ................. 395/438 |
| 5,634,081 A | * | 5/1997 | Krakirian ..................... 710/74 |
| 5,802,327 A | * | 9/1998 | Hawley et al. ............. 710/101 |
| 5,875,481 A | | 2/1999 | Ashton et al. .............. 711/165 |
| 5,883,864 A | | 3/1999 | Saliba .......................... 369/30 |
| 5,911,148 A | | 6/1999 | Anglin et al. ............... 711/111 |
| 5,925,120 A | * | 7/1999 | Arp et al. .................... 710/131 |
| 6,021,454 A | * | 2/2000 | Gibson ........................ 710/129 |
| 6,115,772 A | * | 9/2000 | Crater ......................... 710/129 |
| 6,154,810 A | * | 11/2000 | Derby et al. ................ 711/113 |
| 6,327,613 B1 | * | 12/2001 | Goshey et al. ............. 709/208 |

* cited by examiner

Primary Examiner—Jeffrey Gaffin
Assistant Examiner—Rijue Mai
(74) Attorney, Agent, or Firm—John H. Holcombe (57) ABSTRACT

An intelligent bus listening device, and a method which may be implemented as a computer program product, listens to SCSI commands on a first SCSI bus of a SCSI system via a listening connection to the first SCSI bus. The listening device is separately coupled via an interface to a second bus for communicating commands onto the second bus. A processor is coupled to the listening connection and to the second bus interface, the processor receiving the first commands from the first SCSI bus, converting the first commands to second commands related to the first commands, and providing the second commands to the second bus interface. In a SCSI library that accesses media from storage shelves with an autochanger in response to access commands from hosts, the intelligent bus listening device decouples the first SCSI bus from the autochanger, listens to commands on the first SCSI bus, and converts the access commands to a more efficient set of movement commands, and supplies the movement commands on a separate second bus for the autochanger.

26 Claims, 4 Drawing Sheets

FIG. 3
MEDIA TABLE (70)

| MEDIA ID | LOCATION | |
| --- | --- | --- |
| | STORAGE SHELF | OTHER LOCATION |
| 05176 | 00F7 | |
| 365C3 | | D5 |
| A03F6 | 0173 | |
| B753A | 00A2 | |

71    72    73

FIG. 4
AUTOCHANGER TABLE (80)

| AUTOCHANGER | LOCATION | STATUS |
| --- | --- | --- |
| A1 | 0056 | UNL |
| A2 | D4 | LD |

81    82    83

FIG. 5
DRIVE TABLE (85)

| DRIVE | STATUS | HOST | MEDIA |
| --- | --- | --- | --- |
| D1 | EMPTY | | |
| D2 | READ | 01 | 7BC5A |
| D3 | WAIT | 02 | 06637 |
| D4 | RESERVED | 02 | |
| D5 | WAIT | 02 | 365C3 |
| D6 | WAIT | 01 | 6785B |

86    87    88    89

FIG. 6
READ COMMAND (90)

| BYTE | BIT 7 | BIT 6 | BIT 5 | BIT 4 | BIT 3 | BIT 2 | BIT 1 | BIT 0 |
| --- | --- | --- | --- | --- | --- | --- | --- | --- |
| 0 | OPERATION CODE ||||||||
| 1 | RESERVED ||||||||
| 2 | LOGICAL BLOCK ADDRESS (MSB) ||||||||
| 3 | LOGICAL BLOCK ADDRESS ||||||||
| 4 | LOGICAL BLOCK ADDRESS ||||||||
| 5 | LOGICAL BLOCK ADDRESS (LSB) ||||||||
| 6 | RESERVED ||||||||
| 7 | TRANSFER LENGTH (MSB) ||||||||
| 8 | TRANSFER LENGTH (LSB) ||||||||
| 9 | PBA | RESERVED |||||||

91, 92, 93, 94

FIG. 7
MOVE COMMAND (100)

| BYTE | BIT 7 | BIT 6 | BIT 5 | BIT 4 | BIT 3 | BIT 2 | BIT 1 | BIT 0 |
| --- | --- | --- | --- | --- | --- | --- | --- | --- |
| 0 | OPERATION CODE ||||||||
| 1 | RESERVED ||||||||
| 2-3 | (MSB) TRANSPORT ELEMENT ADDRESS (LSB) ||||||||
| 4-5 | (MSB) SOURCE ELEMENT ADDRESS (LSB) ||||||||
| 6-7 | (MSB) DESTINATION ADDRESS (LSB) ||||||||
| 8-9 | RESERVED ||||||||
| 10 | RESERVED | INVERT |||||||
| 11 | CONTROL BYTE ||||||||

WRITE BUFFER COMMAND 150

| BYTE | BIT 7 | BIT 6 | BIT 5 | BIT 4 | BIT 3 | BIT 2 | BIT 1 | BIT 0 |
|---|---|---|---|---|---|---|---|---|
| 0 | OPERATION CODE |||||||||
| 1 | RESERVED |||| MODE |||| 156 |
| 2 | BUFFER ID ||||||||
| 3 | (MSB) |||||||
| ... | BUFFER OFFSET |||||||
| 5 | | | | | | | | (LSB) |
| 6 | (MSB) |||||||
| ... | PARAMETER LIST LENGTH |||||||
| 8 | | | | | | | | (LSB) |
| 9 | CONTROL ||||||||

(Bytes 3–8 = 160)

*FIG. 9A*

READ BUFFER COMMAND 155

| BYTE | BIT 7 | BIT 6 | BIT 5 | BIT 4 | BIT 3 | BIT 2 | BIT 1 | BIT 0 |
|---|---|---|---|---|---|---|---|---|
| 0 | OPERATION CODE |||||||||
| 1 | RESERVED |||| MODE |||| 157 |
| 2 | BUFFER ID ||||||||
| 3 | (MSB) |||||||
| ... | BUFFER OFFSET |||||||
| 5 | | | | | | | | (LSB) |
| 6 | (MSB) |||||||
| ... | ALLOCATION LENGTH |||||||
| 8 | | | | | | | | (LSB) |
| 9 | CONTROL ||||||||

*FIG. 9B*

SCSI BUS INTELLIGENT LISTENING DEVICE AND METHOD

FIELD OF THE INVENTION

This invention relates to systems employing SCSI buses, and, more particularly, to systems with multiple resources, such as data storage libraries, interconnected with SCSI buses.

BACKGROUND OF THE INVENTION

The typical SCSI (Small Computer Systems Interface) system having multiple resources, such as a data storage library, relies on the attached host to track each of the data storage media stored on storage shelves in the library. The host may utilize the volume serial number (VOLSER) to track each of the data storage media, together with a table indicating the storage shelves on which the media is stored; or may keep track of all of the media by tracking all of the storage shelves on which they are stored, and not use the VOLSER. The host accesses a data storage media by issuing a SCSI access command to the library ordering an autochanger to move to the location of the storage shelf storing the media and access the media, and then to move the media to a selected drive and place the media so that it may be loaded by the drive. If the library has a plurality of data storage drives, the host also tracks which drive is busy and determines which data storage media will be accessed by the autochanger and select the drive for receiving the media. If two hosts are involved, the hosts can communicate with each other to allocate the required media and drives. The library controller will queue input commands, issuing "busy" signals for resources that are in use by another host.

Thus, the hosts require significant time and computing power to work together to operate the data storage system. Additionally, without a high level dynamic allocation system in the hosts, the hosts must parse the drives between themselves so that there is no risk that the same drive will be utilized by more than one host at the same time, leading to inefficiencies in utilization of the data storage system.

Further, the number of hosts that can be attached to the library are limited by the number of data storage drives and by the number of addresses available on the SCSI bus, the addresses normally totaling eight or sixteen.

Still further, a storage system such as a data storage library requires precise interaction between the autochanger and the drives in order to maximize performance. Thus, since the host is not arranged to handle such precise interaction, the data storage drives in a SCSI system are costly, having specialized hard wired connections between the drives and the autochangers to insure that the drive is available, e.g., to receive a data storage media when the autochanger delivers the media. Less costly "off-the-shelf" drives can be used, but results in lower performance.

SUMMARY OF THE INVENTION

It is an object of the present invention to provide a SCSI system, such as a SCSI data storage library, that utilizes multiple resources, such as data storage drives and at least one autochanger, without requiring specialized hard wired communications between the resources to improve library performance, such as cartridge throughput and improving library utilization, without unduly burdening the attached hosts.

Disclosed are an intelligent bus listening device, and a method which may be implemented as a computer program product, for listening to SCSI commands on a first SCSI bus and providing commands on a second bus, for a system having multiple resources, such as a data storage library.

A connection of the intelligent bus listening device is provided to the first SCSI bus for listening to the first SCSI bus; a second bus interface coupled to the second bus for communicating commands onto the second bus; and a processor coupled to the connection and to the second bus interface, the processor listening to first commands on the first SCSI bus; converting the first commands to second commands related to the first commands; and providing the second commands to the second bus interface.

An embodiment is provided for a data storage library that accesses data stored in data storage media in response to access and drive commands from at least one host. The library comprises at least one data storage drive for reading and/or writing data on the data storage media in response to received drive commands, a plurality of storage shelves for storing the data storage media, an autochanger for accessing and moving the data storage media amongst the data storage shelves and the at least one data storage drive in response to received access commands, a first SCSI bus coupled to the drives, the bus receiving the access and drive commands from the hosts, a second bus coupled to the autochanger, and an intelligent bus listening device. The intelligent bus listening device is arranged to listen to the first SCSI bus, listening to commands from the hosts. The intelligent bus listening device is coupled to the second bus, and converts the access commands from the hosts to movement commands, and supplies the movement commands to the second bus for the autochanger.

Access commands may comprise SCSI media mover commands or high level media access commands.

The intelligent bus listening device additionally is coupled to the first SCSI bus and is arranged to provide status response signals on the first SCSI bus to the host in response to the access commands.

If the library has a plurality of autochangers, the intelligent bus listening device additionally allocates the converted access commands among the autochangers.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
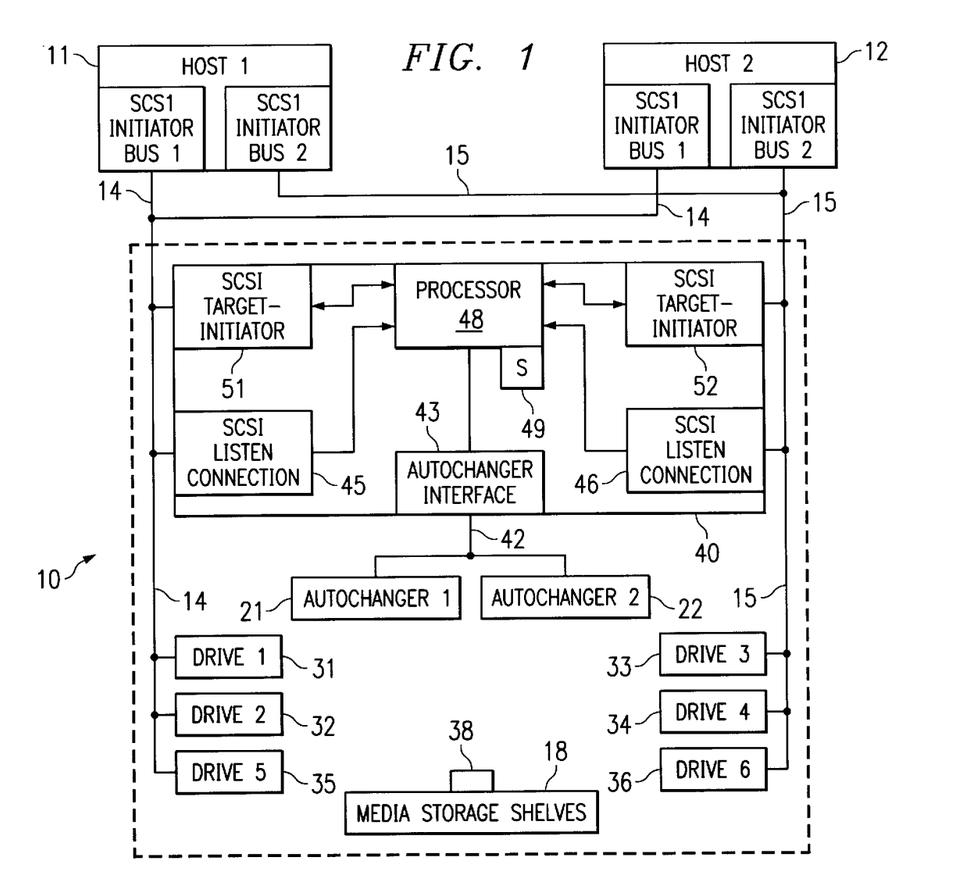
FIG. 1 is a block diagram of an exemplary SCSI data storage library with an embodiment of an intelligent bus listening device of the present invention, and attached hosts.

Referring to FIG. 1, a data storage library 10 is illustrated, coupled to hosts 11–12 by SCSI busses 14–15. An example of a library employed with SCSI busses is the IBM 3995 Optical Library Dataserver, which stores optical media. Similar libraries are available for storing tape cartridges. A data storage library 10 stores the media in storage shelves 18, which may for example comprise 1200 storage shelves, and employs one or more autochangers 21–22 to access and transport the media amongst the storage shelves 18 and a plurality of data storage drives 31–36, and additionally input/output slots 38.

As discussed above, in the conventional library employing SCSI commands, the entire burden of maintaining the inventory of the data storage media, either by VOLSER to storage shelf relationship, or only by storage shelf, is left to the host. The host accesses a data storage media by issuing an access command ordering an autochanger to move to the location of the storage shelf storing the media and access the media, then to move to a selected drive and place the media so that it may be loaded by the drive. If the library has a plurality of data storage drives, the host also tracks which drive is busy and determines which data storage media will be accessed by the autochanger for which drive. If two hosts are involved, the hosts may communicate with each other to allocate the media and the various drives, as well as to make sure that the hosts do not both attempt use the same storage shelf for different data storage media.

In the data storage library of the present invention, the SCSI busses 14–15 are decoupled from the autochangers 21–22, and an intelligent bus listening device 40 is provided which is coupled to the SCSI busses 14–15. The intelligent bus listening device 40 is arranged to listen to the first SCSI busses 14–15, listening to commands from the hosts 11–12. The intelligent bus listening device is coupled to a second bus 42 via interface 43, and converts the access commands from the hosts to movement commands, and supplies the movement commands to the second bus 42 for the autochanger or autochangers 21–22. The access commands provided on the first SCSI busses 14–15 may be either of two types, low level media mover commands such as "pick", "move" and "put", or high level "mount" commands such as "mount" and "demount", for ordering the access of data storage media. The intelligent bus listening device 40 tracks the storage shelf 18 or other location, such as the input/output station 38, of each of the media, tracks the locations and jobs that the autochangers are performing, and tracks the data storage drives 31–36, including the media that are being processed at the drives and the job that each drive is conducting.

As the result, the hosts 11–12 are freed from much of the burden of operating the library, and the intelligent bus listening device may operate the library in a more efficient manner.

The intelligent bus listening device 40 may be similarly employed in other situations to effectively decouple a SCSI peripheral device from a host or a plurality of hosts.

The intelligent bus listening device 40 comprises a SCSI bus listening connection for each SCSI bus. In the illustrated example, SCSI bus listening connection 45 is connected to bus 1 (bus 14), and SCSI bus listening connection 46 is connected to bus 2 (bus 15). The SCSI bus listening connection is essentially the same as the receiving arrangement of a SCSI bus analyzer. An example of a SCSI bus analyzer is the Ultra-2000 from ANCOT Corporation.

The typical SCSI interface must be specifically addressed by a signal on the bus, which triggers the interface to receive the signal, and the interface may acknowledge or respond with a status signal. In contrast, the above SCSI bus listening connections 45–46 each receives every signal on the bus, and acknowledges no signal, putting no signals onto the bus.

A processor 48 is coupled to the SCSI bus listening connections 45–46. The processor may. comprise a microcontroller on a chip with storage, e.g., an Intel microcontroller, and employs the storage 49 for its programming application and as a database for tables, etc.

The processor 48 is coupled to a SCSI interface 51–52 for each bus. The SCSI interfaces may comprise both a target and initiator interface for communicating with the hosts and/or drives. The processor is provided with an operating system and application programs for operating in accordance with the present invention. The application programs may comprise a computer program product, comprising computer readable program code. The computer program product may be supplied electronically, as from a network or a host system 11–12 at one of the interfaces 51–52. Alternatively, the computer program product may be supplied at a drive 31–36 of the library serving as a reader for the processor 48, or directly inserted by means of a read only memory (ROM), the storage media or ROM storing executable computer instructions, and comprising an article of manufacture. The ROM comprises an example of a storage media which is an article of manufacture, and another is a magnetic diskette. Other suitable storage media are optical disk cartridges, magnetic tape cartridges, removable hard disk cartridges, or programmable read only memories (PROM). The requirement for the storage media or memories is that they store digital representations of computer executable instructions.

Referring additionally to FIGS. 2–5, the intelligent bus listening device 40 provides various tables in storage 49 of processor 48. In FIGS. 2A and 2B, queues 60 and 68 represent alternative embodiments of a common queue for queuing the access commands from the hosts. The queue 60 is for a system which utilizes low level media mover access commands that operates an autochanger directly and require the host to track the locations of the data storage media and comprise very specific commands, e.g., to "pick" a media from a specific storage shelf, to "move" a picked media to a specific location, or to "put" the media into a drive. The queue 68 is for a system which utilizes high level "mount" access commands that only identify a data storage media by its identifier, a volume serial number, called a "VOLSER", and either "mount" or "demount" the media. The processor 48 may order or prioritize the commands for the greatest efficiency in operating the library. As an example, the media mover queue 60 of the processor 48 may store the command (op code or op codes) in column 61 for each of the commands that were received from listening connection 45–46. As another example, mount queue 66 stores the commands received from the listening connection 45–46 in column 55. In the library embodiment, either queue contains the commands that relate to accessing the data storage media, such as loading a data storage drive 31–36 with a data storage media from a storage shelf 18 or input/output station 38, unloading a data storage drive and returning the media to a storage shelf or input/output slot, or moving a data storage media amongst the storage shelves 18 and the input/output station 38. The media mover queue 60 may also comprise the identifier of the host from which the command was received in column 62. The queue will also identify the data storage media to be moved, etc., in column 64, the storage shelf storing the media in column 67, and any drive that is known to be involved is identified in column 65. As an example, a data storage media may be in a drive while a host reads and/or writes data on the drive, and, the drive must be identified when the host no longer needs the media and sends a command to unload the media from a drive and store it back in a storage shelf.

Figure 2A:
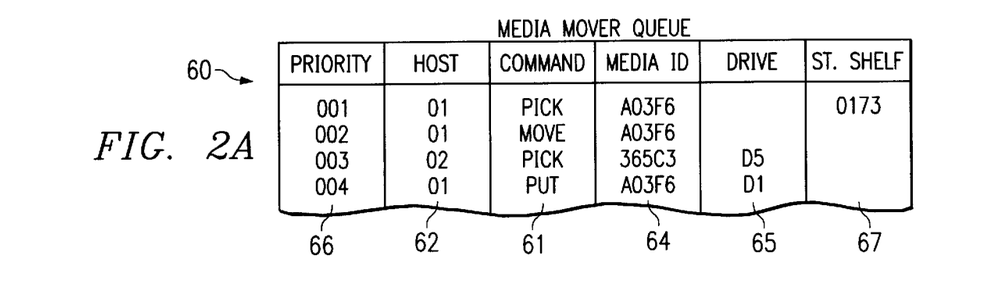
FIGS. 2A and 2B are is a diagrammatic representations of access command queues employed by the intelligent bus listening device of FIG. 1.

In the illustrated example of media mover queue 60, the commands are arranged in sequence and each command has been given a priority in column 66. Alternatively, the commands may be ordered in the queue in the order received, and a sequence number provided in column 66, so that the commands can be arranged in a sequence which may be the same or different from the receipt order. As each command is selected from the queue (or completed), the command 61 and accompanying information is deleted from the queue by the processor 48.

Figure 2B:
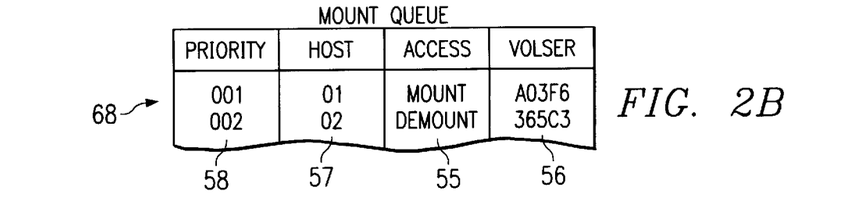

Typical high level commands are to mount or demount data storage media identified by its VOLSER. In the SCSI environment, the commands are conducted as "WRITE BUFFER", etc., commands. In the prior art, a server controller is expected to find the media and operate the autochanger. Thus, the listening device of the present invention allows the processor 48 to intercept the commands and operate as though it is a library or as a server controller. The mount queue .68 stores the VOLSER in column 56, and identifies the host from which the command was received in column 57. The processor 48 may prioritize the commands in column 58. The processor 48 operates the autochanger 21 or 20 to perform several functions for each command, and, therefore may interleave the functions outside the queue 68.

Figure 3:
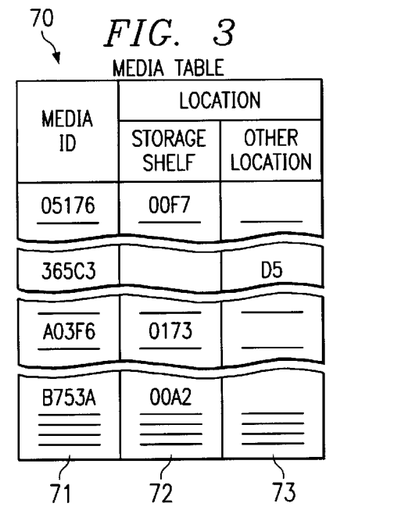
FIG. 3 is a diagrammatic representation of a media table employed by the intelligent bus listening device of FIG. 1.

Referring to FIG. 3, the processor 48 of the intelligent bus listening device 40 provides a media table 70 which correlates the media id, such as a VOLSER, 71 of each data storage media with the location of the media. The locations of the media may comprise a storage shelf as identified in column 72, or in another location 73, such as a data storage drive or an input/output slot. Thus, if a command comprises moving a data storage media, the processor 48 uses the VOLSER 71 in table 70 to look up the present location of the media in column 72 or 73.

Figure 4:
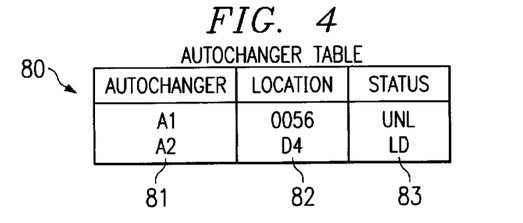
FIG. 4 is a diagrammatic representation of an autochanger table employed by the intelligent bus listening device of FIG. 1.
Figure 5:
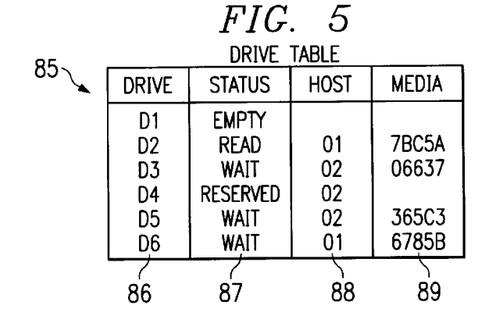
FIG. 5 is a diagrammatic representation of a drive table employed by the intelligent bus listening device of FIG. 1.

The intelligent bus listening device 40 additionally may track the status of the autochangers 21–22 in an autochanger table 80 in FIG. 4, and the status of the drives 31–36 in a drive table 85 in FIG. 5. In FIG. 4, as an example, each autochanger is identified in column 81, its location, either current or last known, is identified in column 82, and its status is identified in column 83. The last known location may comprise the storage shelf that the autochanger was last at, either to place a media in the shelf or to access the media, or may comprise the data storage drive or input/output slot that the autochanger was at to load or unload the media. Alternatively, if the autochanger is moving, identifiers, such as tags, may be located at various points of the library which may be read by the autochanger to identify the locations.

Referring to FIG. 5, the intelligent bus listening device 40 tracks the status of each data storage drive 31–36 in table 85. In the illustrated embodiment, the drives are identified in column 86 and their status is identified in column 87. The host interacting with the drive is identified in column 88, and the media at the drive, if any, is identified in column 89. For example, at drive D2, host 1 is reading media VOLSER 7BC5A, and drive D1 is empty.

Figure 6:
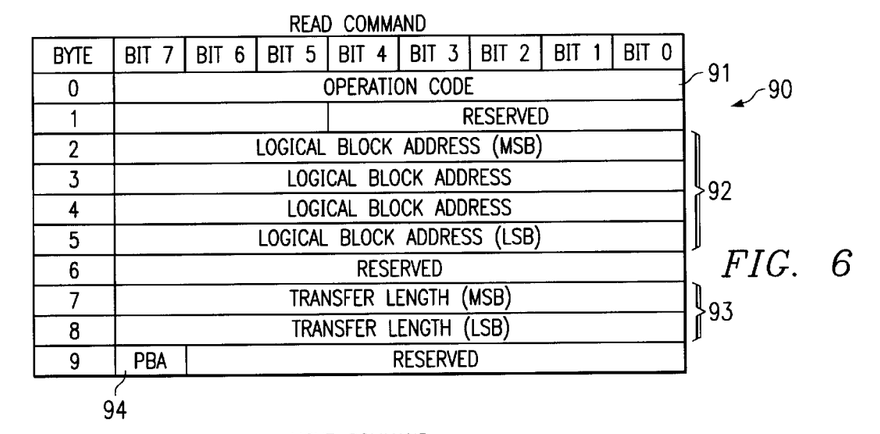
FIG. 6 is a diagrammatic representation of a SCSI read command which may be provided by a host of FIG. 1.

FIG. 6 illustrates an example of a SCSI command from a host on one of the first SCSI busses 14–15 of FIG. 1. SCSI targets are addressed by raising a line of a multi-line address bus. The addresses may be one of 7 lines or one of 15 lines. The specific command is a "read" command 90, and is indicated by an operation code 91. The desired data storage drive that is to read the data is identified on the address bus. The specific data to be read begins at a logical block address 92 on the media, and extends for a transfer length 93. A physical block flag 94 may indicate that physical block addressing is used.

Figure 7:
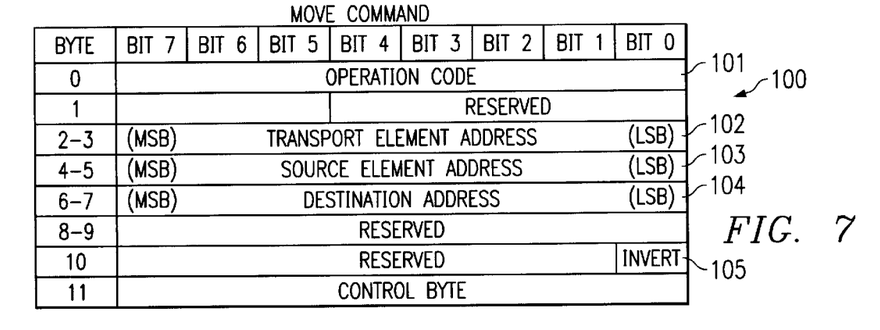
FIG. 7 is a diagrammatic representation of a SCSI move command provided by the intelligent bus listening device of FIG. 1 to the second bus.

Referring to FIG. 1, the second bus 42 from the intelligent bus listening device 40 may comprise a SCSI bus or any other bus compatible with the autochangers 21–22. In a SCSI data storage library 10 having SCSI drives 31–36, the autochangers 21–22 are likely to be SCSI, and therefore bus 42 is advantageously also SCSI. Hence, FIG. 7 illustrates an example of a SCSI command from the intelligent bus listening device 40 to the autochangers via interface 43 and bus 42. The command is a "move" command 100, and identifies the autochanger by its address on the address bus. The move command includes an op code 101, and the source element address 103 and destination address 104 represent the drive, storage shelf, or input/output station that are, respectively, the source and destination of the autochanger. An invert bit 105 may indicate that the media needs to be inverted during the move, such as may be desired with a two-sided optical disk. A transport element address 102 may be provided to indicate which autochanger picker mechanism in a library will perform the media move.

Figure 8:
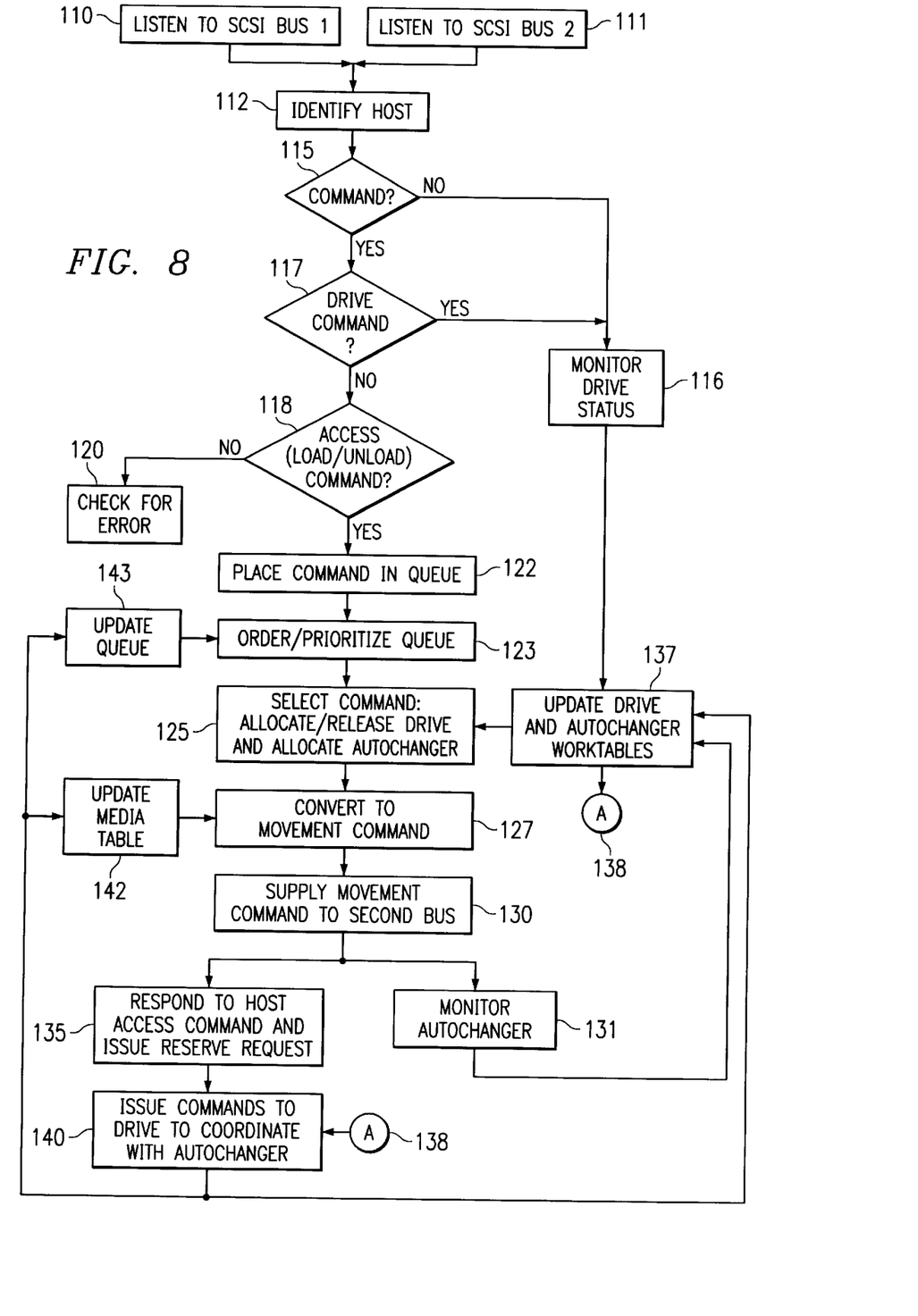
FIG. 8 is a flow chart depicting an embodiment of a method in accordance with the present invention.

FIG. 8 illustrates an embodiment of a method in accordance with the present invention. The method is preferably implemented in the form of a computer program product in a processor, such as processor 48 of FIG. 1.

In steps 110 and 111, the intelligent bus listening device 40 listens, respectively, by SCSI bus listening connections 45 and 46 to bus 1 and bus 2, comprising busses 14–15. In step 112, the processor 48 identifies the host of each input that has been received at the listening connections. The host may be identified as either the source or the destination of the input message. Step 115 identifies whether the message is a command, and, if not, "NO", the message is examined in step 116 and may be utilized to monitor the status of the data storage drives 31–36. For example, a drive may respond to a "TEST I/O" command from a host and provide status that the media has been loaded, that the media is at the desired data, or that the media has been rewound to an initial point and is ready to unload.

If step 115 indicates that the message is a command, step 117 identifies whether the command is a drive command from a host. If so, this command is also utilized in step 116 to monitor the drive status. If it is not a drive command, the determination is made in step 118 whether the command is an access command. If not, it is likely a special command, such as to test or service an autochanger at a garage or special location, or is an error. Hence, step 120 checks for an error and conducts the commanded operation if it is not an error.

If it is an access command as identified in step 118, step 122 places the command in the common queue 60 of FIG. 2A, if in low level mode, or in queue 66 of FIG. 2B if in high level mode. The processor 48 then utilizes the previous state of the queue 60 or 66 to determine, in step 123, the optimum ordering or prioritizing of the commands in the queue. Techniques are available to those of skill in the art to provide optimum ordering or prioritizing the sequence of movements of the autochangers in an efficient manner.

The processor 48, in step 125, selects the next command from the queue and employs the drive status table 85 of FIG. 5, and the autochanger table 80 of FIG. 4 to allocate or release a drive 31–36 and allocate an autochanger 21–22 to conduct the access command that is next in the queue 60 of FIG. 2.

In step 127, the processor 48 converts the access command to a movement command.

As discussed above, in the low level SCSI environment, the host controls both the drive 31–36 and the autochanger 21–22. Thus the host, upon completion of a read or write at a drive, will issue a command to the drive to rewind and unload for a tape drive, or to spin-down for an optical drive, and will wait for the rewind or spin-down to complete, issuing an access command to the autochanger to "PICK" the data storage media at the drive. Then, the host issues another access command to the autochanger to "MOVE" the data storage media from the drive to a desired location, such as a storage shelf 18, and, lastly, another access command to "PUT" the data storage media at the desired location. The host may then issue another series of access commands to the autochanger to "PICK", "MOVE" and "PUT" a data storage media at a data storage drive 31–36. Additionally, once loaded in a drive, a host may plan on reading data from the media and subsequently updating the media, keeping the media in the drive while the data is processed.

The listening device of the present invention monitors the host to drive commands on the first SCSI bus allowing the processor 48 to anticipate the unloading of the media at a drive during the rewind or spin-down, and to begin movement of an autochanger (selected by processor 48) to the drive, thereby increasing the efficiency of the library. Thus, the processor 48 may use the rewind command to initiate an autochanger movement to the drive before the host issues the "pick" command.

Additionally, the monitoring of drive commands on a first SCSI bus from one host 11–12 by the listening device of the present invention may allow the processor 48 to notice that one drive 31–36 is idle while the host conducts processing at another drive, so the processor may temporarily demount the media from the one drive and process access commands for another host at the one drive. If the first host attempts to issue a command to the one drive, the processor may return a "BUSY" signal to the host. Hence, the processor 48 may interleave access commands of the hosts 11–12 that otherwise would be conducted sequentially.

Figure 9A:
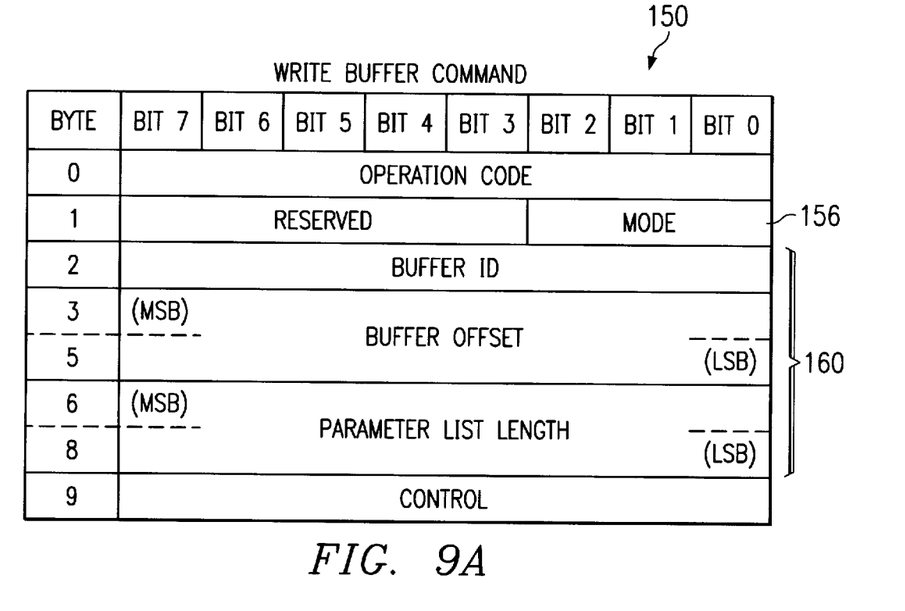
FIGS. 9A and 9B are diagrammatic representations of high level SCSI access commands.
Figure 9B:
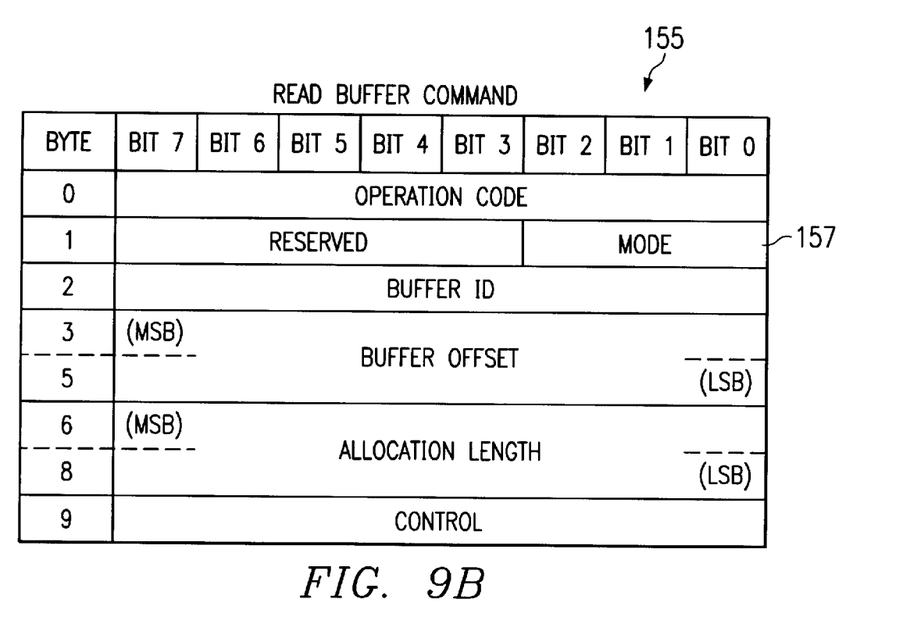

The high level SCSI commands of the hosts 11–12 are directed to a library controller, which the listening device of the present invention emulates. Referring additionally to FIGS. 9A and 9B, high level SCSI commands may be in the form of a "WRITE BUFFER" command 150 and a "READ BUFFER" command 155.

The "WRITE BUFFER" and "READ BUFFER" commands are normally employed as a diagnostic for testing target memory and SCSI bus integrity. The function of the commands and the meaning of the fields depend on the contents of the mode field 156 or 157. In one SCSI standard, a mode field entry of "011x" is a "vendor specific" code, and is employed for the "MOUNT" and "DEMOUNT" commands by the host 11–12. A host "MOUNT" request employing the "WRITE BUFFER" command will contain, in bytes 2 through 8 of area 160, the VOLSER of the media to be mounted.

The listening device of the present invention receives the "WRITE BUFFER" command and loads it in queue 68 of FIG. 2B as a "MOUNT" or "DEMOUNT" command. As an example, in the selected command placed in the queue 68 of FIG. 2B, the host may have requested that a particular media be loaded into a drive. As will be discussed, the media is identified by its VOLSER, and no drive nor storage shelf need be identified. The processor 48 employs the VOLSER and the media table 70 of FIG. 3 to ascertain the actual location of the identified media and converts the command to a movement command of FIG. 7 to tell an autochanger to move to the location of the media, and move the media to the drive selected by the processor.

Specifically, upon reading the "MOUNT" command from queue 68 the processor 48 finds a drive, employing the drive table 85 in FIG. 5; looks up the shelf location of the media, employing the media table 70 of FIG. 3; selects an autochanger, employing the autochanger table 80 in FIG. 4, sending the selected autochanger to the storage shelf 18; and returns status. The host will then send a "READ BUFFER" command which is received by the listening device of the present invention. The processor 48 may respond with data in the buffer indentifying the selected data storage drive 31–36, and the VOLSER on the first SCSI bus 14–15 via the interface 51–52. The processor 48 operates the autochanger to move the media to the selected drive and put the media, while sending signals to the selected drive on the first SCSI bus 14–15 via the interface 51–52 to load the data storage media. The host 11–12 updates its access table and sends "TEST I/O" commands to the selected drive 31–36 until the drive responds with a ready status.

Thus, the listening device of the present invention allows processor 48 to assume a role similar to that of a high level library controller.

As another example, the access command may have requested that the media be unloaded from a drive by means of a "WRITE BUFFER" with a "DEMOUNT" command. The listening device of the present invention receives the command and places it in queue 68. Upon reading the "DEMOUNT" command from the queue, processor 48 ascertains the drive holding the media, and the location of a suitable storage shelf 18 for the media. For example, there may be a "floating" storage shelf or shelves for media to be moved from a drive. This increases the efficiency of the library by allowing shorter moves than requiring that each media be returned to the same storage shelf from which it originated.

Referring to FIG. 8, in either the low level or high level SCSI mode, in step 130, the processor 48 provides the movement command to the second bus 42, employing the autochanger interface 43.

In step 131, the response from the autochanger to the movement command, such as a status signal indicating that the command was received, is received by the interface 43 and is monitored by the processor 48.

Then, the processor 48 employs the one of the SCSI interfaces 51–52 coupled to the same bus 14–15 from which the selected command was received by the listening connection 45–46, to, in step 135, respond to the host access command. The processor may also issue a reserve command, for example, for the drive that was allocated in step 125.

The steps of monitoring the drive status 116 and monitoring the autochanger status 131 comprise inputs to step 137 that updates the drive worktable 85 of FIG. 5 and updates the autochanger worktable 80 of FIG. 4. The tables are thus updated as any new input is supplied. The processor 48 employs the updated worktables, via connectors 138, in step 140, to provide commands to coordinate the drive loading or unloading with the autochanger, so that the media is properly exchanged from one to the other. The "load" or "unload" command(s) to the drive are supplied on the one of the SCSI interfaces 51–52 which is coupled to the drive of the movement command of step 130.

As the movement operation is completed, the processor 48, in steps 142 and 143, updates the media table 70 of FIG. 3 and updates the queue 60 of FIG. 2A or queue 66 of FIG. 2B. The processor then orders or prioritizes the updated queue in step 123 and selects the next command in step 125, additionally employing the updated drive and autochanger worktables of step 137.

Referring to FIGS. 1–8, an example of a low level media mover command comprises the access command received by the listening device of the present invention and stored in queue 60 at priority 001 to PICK the data storage media at storage shelf 0173. The media table 70 identifies the media as having VOLSER A03F6. This command may be selected in step 125. Knowing that the MOVE and PUT commands follow, the processor 48 may refer to the drive table 85, where only drive D1 is available, the other drives currently having media loaded, for example, drive D4 is reserved and the other drives are busy. Thus, drive D1 may be allocated in step 125 and reserved. Referring to the autochanger table 80, autochanger A2 is currently at drive D4 to load cartridge C7762, and autochanger A1 is currently at location 0056, which may comprise the storage shelf, unloading a data storage media from a drive and depositing the media at the storage shelf. The autochanger that completes its current operation first may be allocated in step 125.

An example of a high level mount command as received by the listening device of the present invention is shown as stored in queue 68 at priority 001 to MOUNT the media whose VOLSER is A03F6. The media table 70 identifies the media as stored at storage shelf 0173. This command is treated by the processor 48 in the same manner as the PICK, MOVE and PUT media mover commands of queue 60.

The present invention decouples the first SCSI bus 14–15 from the autochangers 21–22, and provides a listening device which receives the access commands from the hosts. Thus, in step 127, the access command or commands from host 01 is converted to a movement command to cause the autochanger to move to storage shelf 0173, pick the media, and then move to the allocated drive D1. In step 135, a response is submitted on bus B1 to host 01, indicating that the media will be at drive D1, and drive D1 will be reserved. The move and loading of the drive are then coordinated in step 140, and, upon completion of the move, the media table 70 and queue 60 are updated in steps 142 and 143.

The described steps may be modified or changed in sequence as is understood by those of skill in the art.

Thus, the present invention provides a SCSI system, such as a SCSI data storage library, that utilizes multiple resources, such as data storage drives and at least one autochanger, without requiring specialized hard wired communications between the resources, such as between the autochangers and the data storage drives, and without unduly burdening the attached hosts, by organizing the moves and updating the tables and converting the commands to movement commands, without requiring coordination between the hosts. By listening to the commands and decoupling the hosts and autochangers, the library system of the present invention enhances the performance of the library and allows hosts to operate at a VOLSER level without tracking physical locations in a conventional SCSI environment.

The listening device of the present invention also may be used to improve the reliability, availability and serviceability of a SCSI system by monitoring errors and check conditions. In a library, listening and monitoring drive and autochanger check conditions and temporary and permanent errors provides an insight into the functionality of the system. Further, by monitoring retries and repetitive errors, the processor can predict maintenance on a drive or autochanger. Additionally, drive versus media errors can be isolated by tracking load/unload statistics.

While the preferred embodiments of the present invention have been illustrated in detail, it should be apparent that modifications and adaptations to those embodiments may occur to one skilled in the art without departing from the scope of the present invention as set forth in the following claims.

We claim:

1. A data storage library for accessing data stored in data storage media in response to access and drive commands from at least one host, comprising:

at least one data storage drive for reading and/or writing data on said data storage media in response to received drive commands;

a plurality of storage shelves for storing said data storage media;

an autochanger for accessing and moving said data storage media amongst said data storage shelves and said at least one data storage drive in response to received movement commands;

a first SCSI bus coupled to said at least one drive, said first SCSI bus receiving said access and drive commands from said at least one host;

a second bus coupled to said autochanger; and an intelligent bus listening device coupled to said second bus, arranged to listen to said first SCSI bus, listening to commands from said at least one host, to convert said access commands from said at least one host to movement commands, and to supply said movement commands to said second bus for said autochanger.

2. The data storage library of claim 1, wherein said intelligent bus listening device additionally is coupled to said first SCSI bus and is arranged to provide status response signals on said first SCSI bus for said at least one host in response to said access commands.

3. The data storage library of claim 2, comprising a plurality of said data storage drives, each having a different address, and wherein said intelligent bus listening device additionally selects one of said drives for said movement command of said autochanger for delivering said data storage media, and provides said address of said selected drive on said first SCSI bus for said at least one host in response to said access command.

4. The data storage library of claim 1, for accessing data stored in said data storage media in response to access and drive commands from a plurality of hosts; wherein said first SCSI bus receives said commands from said plurality of hosts; and wherein said intelligent bus listening device additionally listens to commands on said first SCSI bus from each of said plurality of hosts.

5. The data storage library of claim 4, wherein said intelligent bus listening device additionally comprises a common queue for queuing said access commands of said plurality of hosts.

6. The data storage library of claim 5, comprising a plurality of said autochangers, and wherein said intelligent bus listening device additionally allocates said converted access commands among said plurality of autochangers.

7. The data storage library of claim 5, wherein said intelligent bus listening device additionally listens to said drive commands from said plurality of hosts, employing said drive commands to convert and order said access commands of said common queue.

8. The data storage library of claim 1, wherein said intelligent bus listening device comprises a connection to said first SCSI bus for listening to said first SCSI bus; a second bus interface coupled to said second bus for communicating commands onto said second bus; and a processor coupled to said connection and to said second bus interface, said processor listening to said commands from said at least one host on said first SCSI bus, converting said commands from said at least one host to movement commands, and supplying said movement commands to said second bus interface for said autochanger.

9. An intelligent bus listening device for listening to SCSI commands on a first SCSI bus and providing commands on a second bus, comprising:

a connection to said first SCSI bus for listening to said first SCSI bus;

a second bus interface coupled to said second bus for communicating commands onto said second bus; and a processor coupled to said connection and to said second bus interface, said processor listening to first commands on said first SCSI bus; converting said first commands to second commands related to said first commands; and providing said second commands to said second bus interface.

10. The intelligent bus listening device of claim 9, additionally comprising a first bus SCSI interface coupled to said first SCSI bus; and wherein said processor additionally provides status response signals to said first SCSI bus interface in response to said first commands.

11. The intelligent bus listening device of claim 9, additionally comprising a queue for queuing said second commands.

12. The intelligent bus listening device of claim 11, wherein said processor additionally arranges said second commands in an order in said queue.

13. A method for operating a data storage library; said library having at least one data storage drive for reading and/or writing data on data storage media in response to received drive commands; a plurality of storage shelves for storing said data storage media; an autochanger for accessing and moving said data storage media amongst said data storage shelves and said at least one data storage drive in response to received movement commands; a first SCSI bus coupled to said at least one drive, said first SCSI bus receiving access and drive commands from at least one host; a second bus coupled to said autochanger; and a processor having a connection to said first SCSI bus and having a second bus interface coupled to said second bus, said method comprising:

said processor listening at said connection to commands on said first SCSI bus from said at least one host;

said processor converting said access commands from said at least one host to movement commands; and said processor supplying said movement commands at said second bus interface to said second bus for said autochanger.

14. The method of claim 13, wherein said data storage library processor additionally comprises a first bus SCSI interface coupled to said first SCSI bus, and wherein said method additionally comprises providing status response signals to said first SCSI bus interface in response to said access commands.

15. The method of claim 14, wherein said data storage drive comprises a plurality of said data storage drives, each having a different address, and said method additionally comprises selecting one of said drives for said movement command of said autochanger for delivering said data storage media, and providing said address of said selected drive on said first SCSI bus for said at least one host in response to said access command.

16. The method of claim 13, for accessing data stored in said data storage media in response to access and drive commands from a plurality of hosts; wherein said first SCSI bus receives said commands from said plurality of hosts; said method additionally comprising listening to commands on said first SCSI bus from each of said plurality of hosts.

17. The method of claim 16, additionally comprising queuing said access commands of said plurality of hosts.

18. The method of claim 17, wherein said data storage library comprises a plurality of said autochangers; said method additionally allocating said converted access commands among said plurality of autochangers.

19. The method of claim 17, additionally comprising listening to said drive commands on said first SCSI bus from said plurality of hosts, employing said drive commands to convert and order said queued access commands.

20. A computer program product usable with a programmable computer processor having computer readable program code embodied therein, said programmable computer processor in a data storage library; said library having at least one data storage drive for reading and/or writing data on data storage media in response to received drive commands; a plurality of storage shelves for storing said data storage media; an autochanger for accessing and moving said data storage media amongst said data storage shelves and said at least one data storage drive in response to received movement commands; a first SCSI bus coupled to said at least one drive, said first SCSI bus receiving access and drive commands from at least one host; and a second bus coupled to said autochanger; said programmable computer processor having a connection to said first SCSI bus and having a second bus interface coupled to said second bus, comprising:

computer readable program code which causes said programmable computer processor to listen at said connection to commands on said first SCSI bus from said at least one host;

computer readable program code which causes said programmable computer processor to convert said access commands from said at least one host to movement commands; and computer readable program code which causes said programmable computer processor to supply said movement commands at said second bus interface to said second bus for said autochanger.

21. The computer program product of claim 20, wherein said programmable computer processor additionally comprises a first bus SCSI interface coupled to said first SCSI bus, and wherein said computer readable program code additionally causes said programmable computer processor to provide status response signals to said first SCSI bus interface in response to said access commands.

22. The computer program product of claim 21, wherein said data storage library comprises a plurality of said data storage drives, each having a different address, and wherein said computer readable program code additionally causes said programmable computer processor to select one of said drives for said movement command of said autochanger for delivering said data storage media, and provide said address of said selected drive on said first SCSI bus for said at least one host in response to said access command.

23. The computer program product of claim 20, for accessing data stored in said data storage media in response to access and drive commands from a plurality of hosts; wherein said first SCSI bus receives said commands from said plurality of hosts; wherein said computer readable program code additionally causes said programmable computer processor to listen to commands on said first SCSI bus from each of said plurality of hosts.

24. The computer program product of claim 23, wherein said computer readable program code additionally causes said programmable computer processor to queue said access commands of said plurality of hosts.

25. The computer program product of claim 24, wherein said data storage library comprises a plurality of said autochangers; and wherein said computer readable program code additionally causes said programmable computer processor to allocate said converted access commands among said plurality of autochangers.

26. The computer program product of claim 24, wherein said computer readable program code additionally causes said programmable computer processor to listen to said drive commands on said first SCSI bus from said plurality of hosts, employing said drive commands to convert and order said queued access commands.

* * * * *

UNITED STATES PATENT AND TRADEMARK OFFICE
CERTIFICATE OF CORRECTION

PATENT NO.    : 6,513,074 B1
DATED         : January 28, 2003
INVENTOR(S)   : Dimitri et al.

It is certified that error appears in the above-identified patent and that said Letters Patent is hereby corrected as shown below:

<u>Column 12,</u>
Lines 62-63, move "at said second bus interface to said second bus for said autochanger.", to follow -- commands -- on line 61.

This will change 2 paragraphs to 1 paragraph.

Signed and Sealed this

Third Day of June, 2003

JAMES E. ROGAN
*Director of the United States Patent and Trademark Office*